No. 709,907. Patented Sept. 30, 1902.
P. HUEBNER.
SPRINKLER HEAD.
(Application filed Mar. 20, 1902.)
(No Model.)

Witnesses
Geo. W. Young
N. E. Oliphant

Inventor
Paul Huebner
By H. G. Underwood
Attorneys

UNITED STATES PATENT OFFICE.

PAUL HUEBNER, OF MILWAUKEE, WISCONSIN.

SPRINKLER-HEAD.

SPECIFICATION forming part of Letters Patent No. 709,907, dated September 30, 1902.

Application filed March 20, 1902. Serial No. 99,040. (No model.)

*To all whom it may concern:*

Be it known that I, PAUL HUEBNER, a citizen of the United States, and a resident of Milwaukee, in the county of Milwaukee and State of Wisconsin, have invented certain new and useful Improvements in Sprinkler-Heads; and I do hereby declare that the following is a full, clear, and exact description thereof.
The improvements consist in certain peculiarities of construction and combination of parts, hereinafter particularly set forth with reference to the accompanying drawings and subsequently claimed, the object of the invention being to provide simple economical rotary sprinkler-heads.

Figure 1:
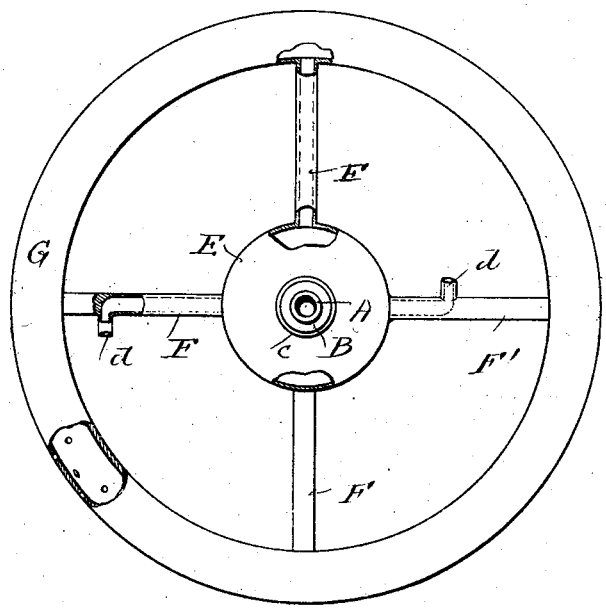
Figure 2:
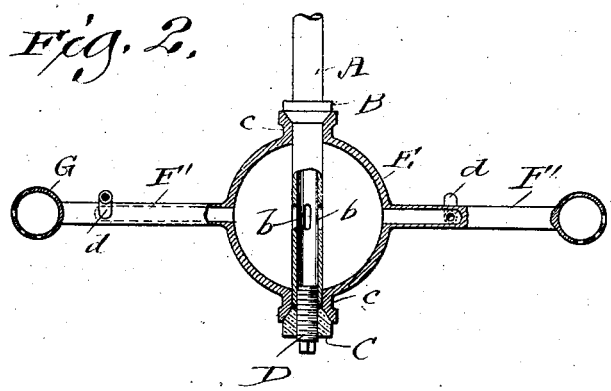

Figure 1 of the drawings represents a plan view of a sprinkler-head in accordance with my invention, partly in section; and Fig. 2, a partly-sectional elevation of the same.

Referring by letter to the drawings, A indicates a straight tube having a rigid conical bearing-collar B and provided with apertures b intermediate of said collar and another bearing-collar C, that has screw-thread connection with a plug D, in like connection with one end of said tube. Arranged on tube A is a hollow spherical hub E, having diametrically opposite socket projections c, engaged by bearing-collars B C, the collar C being adjustable to regulate friction and compensate for wear. Spokes F F' connect hub D with a hollow perforated annular tube G, spokes F being hollow their entire length to establish communication between said hub and annular tube; but spokes F' are only partly hollow outward from said hub. Each spoke F' is provided with an outlet-nipple d, that of one of said spokes being nearer hub D than that of the other.

In practice the open end of tube A is coupled to a sprinkler-system branch or stand-pipe, or it may be provided with a portable support and coupled to a hose in connection with a water-service fixture. The water under pressure causes automatic rotation of the sprinkler, and there is distribution of said water from the spoke-outlets and annular perforated tube of said sprinkler.
Having thus described my invention, what I claim as new, and desire to secure by Letters Patent, is—

1. A sprinkler-head comprising a straight apertured tube closed at one end and provided with bearing-collars one of which is adjustable, a hollow hub loose on the tube to inclose the apertures of same and provided with diametrically opposite sockets engaged by the bearing-collars, hollow distributing-spokes that being in connection with the hub have their outlets at different distances from the same, and a perforated annular tube in connection with the said spokes.

2. A sprinkler-head comprising a straight apertured tube closed at one end and provided with bearing-collars one of which is adjustable, a hollow hub loose on the tube to inclose the apertures of same and provided with diametrically opposite sockets engaged by the bearing-collars, spokes in connection with the hub, and a perforated annular tube in connection with the spokes some of which are hollow their entire length to establish communication between said hub and annular tube, the remainder being partly hollow outward from the aforesaid hub and having their outlets at different intervals of the radius.

3. A sprinkler-head comprising a straight apertured tube having a bearing-collar rigid thereon, a plug in screw-thread connection with one end of the tube, a bearing-collar in like connection with said plug, a hollow hub loose on said tube to inclose its apertures and provided with diametrically opposite sockets engaged by the bearing-collars, spokes in connection with the hub, and a perforated annular tube in connection with the spokes some of which are hollow their entire length to establish communication between said hub and annular tube, the remainder being partly hollow outward from the aforesaid hub and having their outlets at different intervals of the radius.

In testimony that I claim the foregoing I have hereunto set my hand, at Milwaukee, in the county of Milwaukee and State of Wisconsin, in the presence of two witnesses.

PAUL HUEBNER.

Witnesses:
N. E. OLIPHANT,
B. C. ROLOFF.